Oct. 29, 1935. I. BOND 2,019,391
SCREW THREADING TOOL
Filed June 9, 1934 2 Sheets-Sheet 1
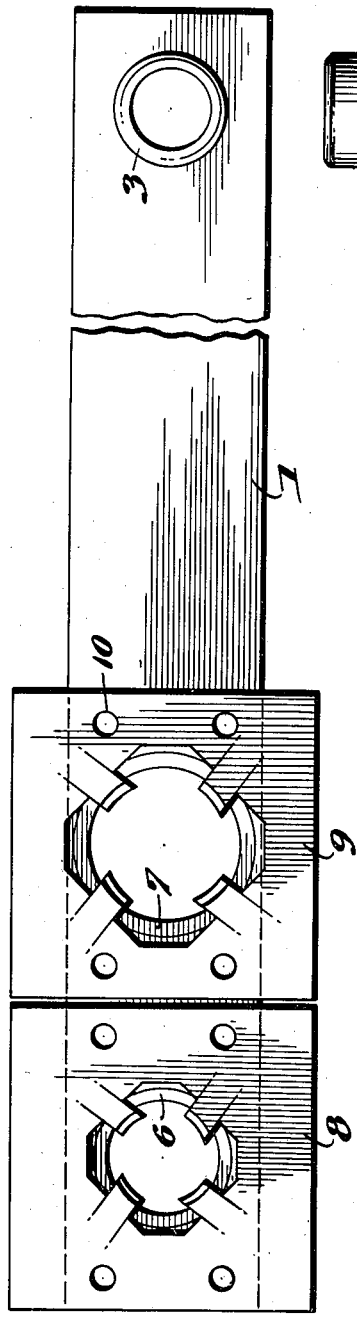
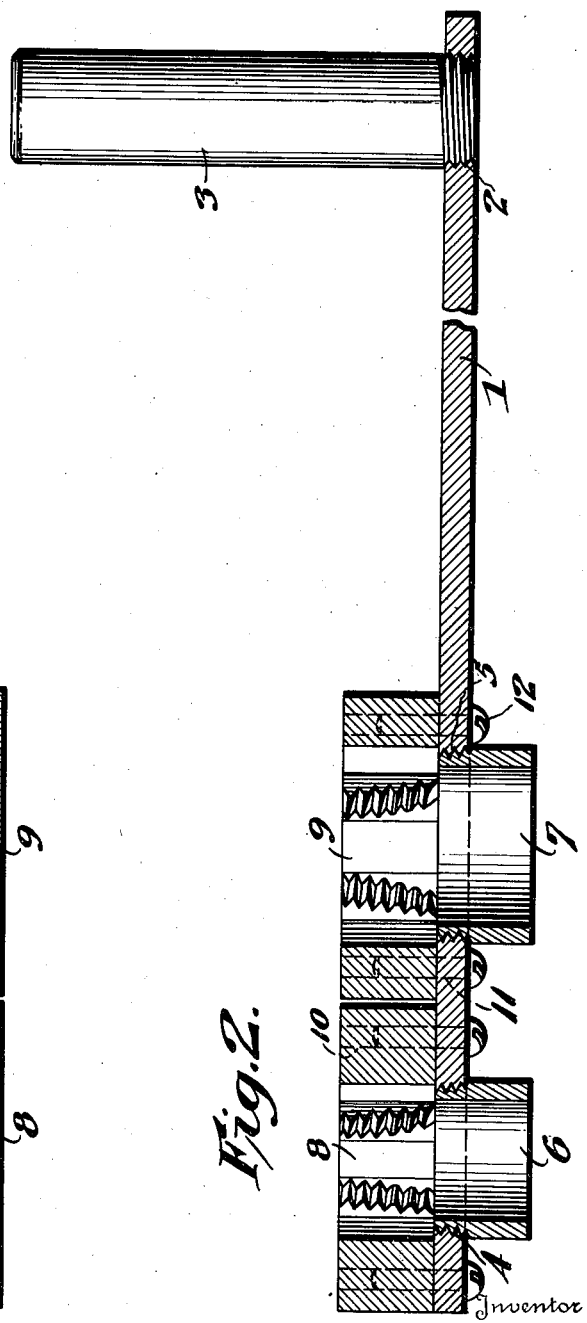
Inventor
*Ignatius Bond*
By *Lloyd W. Patek*
Attorney Oct. 29, 1935.   I. BOND   2,019,391
SCREW THREADING TOOL
Filed June 9, 1934   2 Sheets-Sheet 2
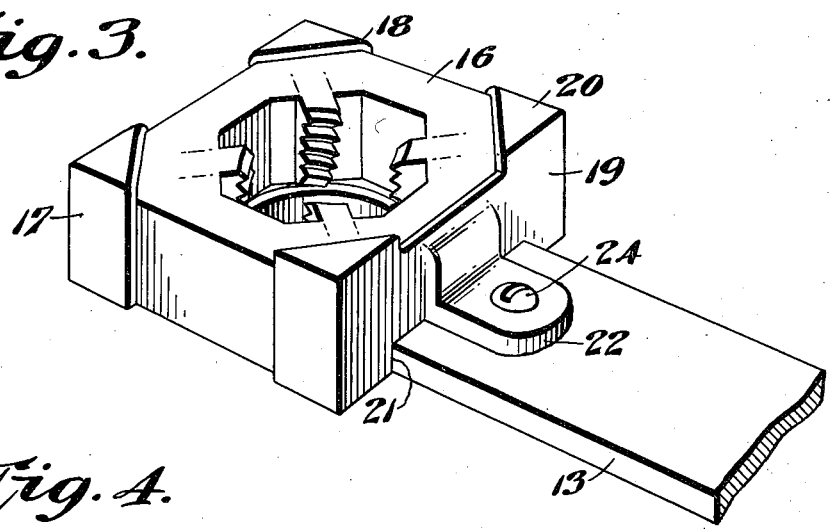
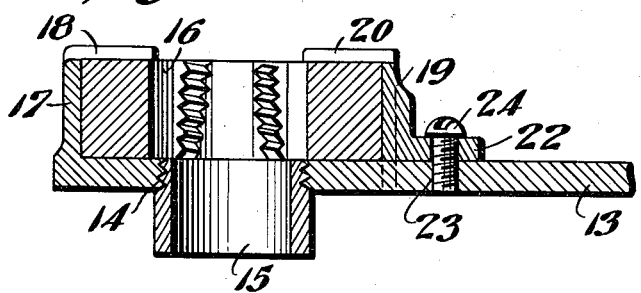
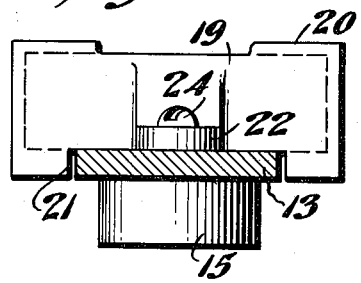
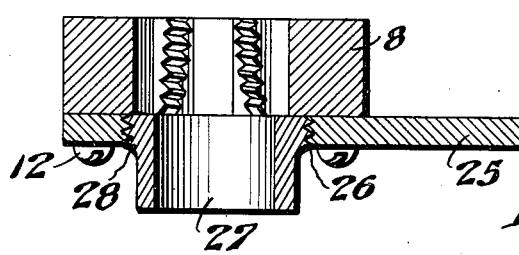
Inventor
Ignatius Bond
By Lloyd W. Patek
Attorney Patented Oct. 29, 1935

2,019,391

UNITED STATES PATENT OFFICE 2,019,391

SCREW THREADING TOOL

Ignatius Bond, Evanston, Ill., assignor of one-half to Karl Reifenberg, Chicago, Ill.

Application June 9, 1934, Serial No. 729,927

6 Claims. (Cl. 10—123)

My invention relates to improvements in screw threading tools, and particularly to a device of this character intended and adapted for use in threading pipe, such as electrician's conduits, and in other connections to thread pipe or rod members.

An object of my invention is to provide a simple and inexpensive threading implement carrying one or more threading dies and having guides cooperating therewith to enable anyone to cut quick and accurate threads.

Another object is to so construct and assemble the tool that the parts thereof can be readily interchanged and replaced, and at the same time the parts can be disassembled to adapt the tool for placement in an electrician's tool box, or in other small space for ready and convenient carrying.

A further object is to provide a threading tool which is relatively much lighter than standard or ordinary pipe threading tools now on the market, thus being particularly suitable to be carried in a tool box or other light tool kit.

Still another object is to provide a tool of this character adapted for use in making screw threads upon electrician's conduits, or for use in other connections where the sizes of the pipe or rod to be threaded are more or less uniform and restricted, and which tool will serve substantially all of the needs and requirements, without the necessity of having a multiplicity of adjustable or interchangeable dies, or an expensive and complicated adjustable die head.

With the above and other objects in view, which will be apparent to those skilled in the art, my invention includes certain novel features of construction and combinations of parts which will be hereinafter set forth in connection with the drawings, and then pointed out in the claims.

In the drawings:

Figure 1 is a view in elevation showing one adaptation of my invention.

Fig. 2 is a longitudinal section taken transversely through the tool as illustrated in Figure 1.

Fig. 3 is a fragmentary perspective view illustrating another adaptation of the invention.

Fig. 4 is a longitudinal sectional view through the parts as shown in Fig. 3.

Fig. 5 is a transverse sectional view to better show the construction of the die holding structure.

Fig. 6 is a fragmentary sectional view illustrating another modification that might be resorted to.

Electricians making exposed installations, and in many cases installations within walls or otherwise concealed, must bend and cut this pipe conduit to suit the particular requirements of each individual job, and this work must ordinarily be done on the job. Therefore, it is highly desirable that an electrician have and continuously carry in his tool box or bag some pipe threading equipment capable of running pipe threads quickly and with facility. Heretofore, it has been necessary for an electrician to have a pipe stock and dies, with appropriately sized guides, or an expensive and complicated adjustable pipe stock, such as are ordinarily used by plumbers, steamfitters, and the like. This has necessitated the electrician buying equipment capable of being used in threading some four or five different sizes of pipe, say for instance one-fourth inch, three-eighths inch, one-half inch, three-fourths inch and one inch pipe, and consequently the number of parts to be carried and the cost have been proportionately increased. Ordinarily the electrician is required to use either one-half inch or three-fourths inch pipe, and the other dies and guides of an ordinary pipe stock and die set, of either the "Standard" or "Armstrong" type offer just so many additional expensive parts to be purchased and to be either carried with the consequent increase of weight and bulk, or to be discarded with consequent loss. If the electrician acquire an adjustable pipe stock of the "Oster" type, this involves a considerable expenditure and the tool is not only heavy and bulky to carry, but is somewhat complicated to set up and adjust. The objections have led in some instances to the electrician carrying only the square die blocks of the "Standard" type, in the one-half inch and the three-fourths inch sizes, and then attempting to manipulate these die blocks with the ordinary wrench and vise. Naturally, it is practically impossible for anyone to cut accurate threads quickly and properly upon a pipe end by such makeshift means, and it is the primary purpose of my invention to provide a tool particularly adapted for use by electricians and others requiring only one or two sizes of threading implement, that is of simple and inexpensive construction, to thus be available for addition to the individual kit of each electrician, and that can be readily, conveniently and compactly stored in even a small hand tool box or tool bag.

As the parts are illustrated in Figs. 1 and 2 I have shown a tool particularly adapted for use by electricians, and which can be used in threading two sizes of pipe, as for instance electrician's conduits in one-half inch and three-fourths inch sizes, as usually, required by underwriters' specifications or municipal or other regulations. In this adaptation, an elongated bar 1 has an opening 2 formed at one end thereof and internally screw threaded to removably receive a handle 3, which can be conveniently made as a short length or pipe provided at one end with a pipe thread to be conveniently turned into and hold within the corresponding thread of the opening 2, and to be as conveniently unscrewed and removed.

Adjacent the other end of the bar 1 openings 4 and 5 are provided, and these openings are formed through the bar and are provided with internal screw threads. These openings 4 and 5 are intended and adapted to removably receive and hold pipe guide sleeves 6 and 7, which are in the present instance made as short lengths of pipe or tubing of sufficient diameter to receive and yet turn upon the end of one-half inch pipe and three-fourths inch pipe, respectively. As the pipe guides 6 and 7 are externally threaded at one end and are turned into the threaded openings 4 and 5 they can be readily removed and replaced.

An ordinary pipe threading die, of the so-called "Standard" type has only the thread cutting portions made of hardened material or tool steel, and the body of the block is ordinarily of soft material that can be readily drilled and tapped. With this in mind, I provide the die blocks 8 and 9 to be mounted upon the bar 1 on the opposite side from the pipe guides 6 and 7, and substantially centered with respect thereto. The die blocks have drill holes sunk transversely through the body portion at suitably spaced points to avoid the hardened cutting portions of the die, and these holes 10 are internally screw threaded. Openings 11 are provided through the bar 1 to register with the screw thread holes 10 of the die block, when the block is placed on the opposite side of the bar 1 and is centered with respect to the respective pipe guide, and bolts or screws 12 are provided to be passed through the openings 11 and turned into the threaded holes 10 to secure and clamp the die block rigidly in the properly centered relation.

Obviously, the handle portion 3 will preferably be assembled to extend laterally from the bar 1 on the same side as the die blocks 8 and 9, and when this handle 3 is removed the pipe guides 6 and 7 on the one side and the die blocks 8 and 9 on the other side will offer very little extension or protrusion from the elongated bar 1. The bar 1 can be made of any desired length, width and thickness, depending upon the particular requirements of use, and the handle portion 3 can be made of any desired and appropriate length and size.

I have found that a tool constructed and proportioned substantially after the manner illustrated in the drawings is well suited for use by electricians and others, as the handle 3 forms a convenient means for manipulating and turning the bar 2 when threading pipe. Further, I have found it advantageous to arrange the two sizes of pipe guides and die blocks as illustrated for the reason that when threading the three-fourths inch pipe the extending end of the bar 1 carrying the one-half inch die block can be grasped to permit a better manipulation and application of force to turn or swing the bar in the forward movement to cut the thread and reverse movement to clear the thread.

In the adaptation illustrated in Figs. 3, 4 and 5, the bar 13 has a threaded opening 14 in which is fitted and held the pipe guide 15. The die block 16 is of the same form as set forth above and is adapted to be centered on the opposite side of the bar 13 with respect to the pipe guide 15. A clip portion 17 is provided on the bar 13 to receive one side of the die block 16 and is provided with overlying flange portions 18 to engage over the die block. A movable clip portion 19 is constructed and shaped to fit the die block 16 on the side opposite the clip portion 17 and has overhanging flange portions 20 to engage the outer face of the die block. This removable clip portion 19 has a notch or groove 21 formed therein to receive the transverse width of the bar 13 and has a securing flange 22 extending to lie upon the adjacent face of the bar 13, which extending flange 22 is provided with an opening to receive a fastening. The bar 13 has a screw threaded opening 23 formed therein and a clamp bolt 24 is provided to fit through the opening of the flange 22 and be turned in the threaded opening 23 of the bar 13 to secure the clip 19 in place. With this construction and arrangement of the parts, the clip portions 17 and 19 rigidly secure the die block 16 in properly centered relation with respect to the pipe guide 15, and on the opposite side of the bar 13. By removal of clamp screw 24, the die block 16 can be readily removed and renewed or replaced with another die block.

In Fig. 6 I have illustrated a modification in which the bar 25 has a screw threaded opening 26 therethrough sufficiently large to accommodate a pipe guide 27 of the maximum size that can be threaded by the largest die block to be accommodated by the tool, and when a smaller size of pipe is to be threaded the pipe guide 27 will be provided with an extending screw threaded portion 28 to accommodate the guide sleeve to the threaded opening 26, and yet permit the opening therethrough to be sufficiently restricted for the smaller size of pipe being threaded.

While I have herein shown and described only certain specific embodiments of my invention and have set forth only certain possible modifications and variations in the construction, arrangement, assembly and use of the tool, it will be appreciated that other changes can be made without departing from the spirit and scope of my invention.

I claim:

1. A threading tool comprising, a bar having a threaded opening therethrough, a die block mounted on one side of the bar and centered with respect to the opening, and a pipe guide sleeve held in the threaded opening and extending from the opposite side of the bar.

2. A threading tool comprising, a bar having a threaded opening therethrough, a pipe guide sleeve removably held in the threaded opening to extend from one side of the bar, a die block and means to clamp the die block on the opposite side of the bar to be centered with respect to the pipe guide sleeve.

3. A threading tool comprising, a bar having threaded openings therethrough adjacent to each end, a guide sleeve mounted to extend from the opening at one end on one side of the bar, a die block secured on the opposite side of the bar and centered with respect to the guide sleeve, and a handle removably fitted in the threaded opening at the other end of the bar to extend therefrom on the same side with the die block.

4. A threading tool comprising, an elongated bar, pipe threading means carried adjacent to one end of said bar, and relatively larger pipe threading means carried by said bar toward the middle whereby when a larger pipe is to be threaded the portion of the bar carrying the first mentioned threading means extends to be grasped to aid in manipulation of the bar, said threading means being relatively spaced on and projecting from one side of the bar.

5. A pipe threading tool comprising, an elongated flat bar having a threaded opening therethrough adjacent to one end, a pipe guide removably fitted in said threaded opening to extend from one side of the bar, a die block located on the opposite side of the bar and centered with respect to the pipe guide, and means to clamp and rigidly hold the die block upon the bar.

6. A pipe threading tool comprising, an elongated flat bar member having a threaded opening therethrough adjacent to one end, a die block fitted in flatwise relation upon one side of the bar axially with relation to the threaded opening, clamp screws by which said die block is rigidly mounted in place, and a tubular pipe guide removably fitted in said threaded opening and extending from the face of the bar opposite to the face on which the die block is mounted.

IGNATIUS BOND.